United States Patent [19]

Erickson

[11] Patent Number: 4,923,296

[45] Date of Patent: May 8, 1990

[54] ORIENTED, SIMULTANEOUS VISION BIFOCAL CONTACT LENSES OR THE LIKE UTILIZING INTROAOCULAR SUPPRESSION OF BLUR

[76] Inventor: Paul M. Erickson, 135 Chadwick Dr., Rochester, N.Y. 14618

[21] Appl. No.: 219,495

[22] Filed: Jul. 14, 1988

[51] Int. Cl.⁵ .......................... G02C 7/04; A61F 2/16
[52] U.S. Cl. ......................................... 351/161; 623/6
[58] Field of Search ............... 351/160 R, 160 H, 161, 351/162; 623/6

[56] References Cited

U.S. PATENT DOCUMENTS 3,431,327  3/1969  Tsuetaki ........................ 351/161 X

FOREIGN PATENT DOCUMENTS 0201231 11/1986 European Pat. Off. ............ 351/161
3222099 12/1983 Fed. Rep. of Germany ...... 351/161

*Primary Examiner*—Scott J. Sugarman
*Attorney, Agent, or Firm*—John S. Norton

[57] ABSTRACT

A lens system comprises a pair of corrective lenses whose surfaces are divided into a series of substantially discrete near and distant vision zones whose dimensions and positions are such that, relative to the line of sight of the right and left eye respectively, each zone on one lens containing the distance power correction corresponds to a similar zone on the other lens containing the near power correction.

7 Claims, 2 Drawing Sheets

(MONOVISION CORRECTION)

ORIENTED SIMULTANEOUS VISION BIFOCAL CONTACT LENSES OR THE LIKE UTILIZING INTROAOCULAR SUPPRESSION OF BLUR

BACKGROUND OF THE INVENTION

This invention relates to bifocal contact lenses of the simultaneous vision variety wherein the lenses are constructed such that when placed on the eye the distant and near zones are disposed in opposite arrangement before the two eyes.

Bifocal contact lenses generally speaking can be separated into two distinct types. One type is known as simultaneous vision bifocals and in this type of lens the distance and near vision zones are situated such that both zones are simultaneously represented in the entrance pupil of the eye. Most commonly, this is accomplished by a discrete central circular zone containing the distance or near vision correction surrounded by an annular zone containing the other vision correction. Other common configurations incorporate a continuously changing, aspheric, power.

The second type of lens is known as the alternating vision bifocal. Lenses of this variety are generally constructed such that the lens is oriented to contain the distance vision correction in the upper portion of the optical zone and the near vision correction in the lower portion of the optical zone. Such lenses commonly incorporate mechanical design features that maintain the proper orientation and allow the distance vision zone to occupy the entrance pupil in straight ahead gaze and the near vision zone to occupy the entrance pupil in downgaze for near viewing.

In a simultaneous vision bifocal, the relationship between the distance zone and the near zone is quite critical. In order for the lens to function properly, it must permit approximately equal amounts of light into the eye through both the near zone and the distance zone. This is required so that vision is not biased toward either vision correction. Obviously, because of the great variation in light levels, which accordingly change the diameter of the pupil, a compromise must be settled upon when selecting the size of each zone. This problem is further complicated as the difference in pupil size varies substantially from patient to patient. Examples of these types of lenses may be seen in U.S. Pat. Nos. 4,636,049; 4,418,991; 4,210,391; 4,162,172; and 3,726,587.

The problem of pupil dependency of simultaneous vision bifocal performance is claimed to be diminished by a further embodiment of simultaneous vision bifocals that operates under the principles of diffraction. Examples of these types of lenses may be seen in U.S. Pat. Nos. 4,641,934 and 4,642,112.

In alternating vision bifocals, the lens is constructed so as to move freely upon the cornea. The distance vision zone is normally positioned before the pupil in straight ahead gaze. As the eye is lowered to a reading position the lens, generally because of ballasting and/or inferior edge truncation built into the lens, encounters the lower eyelid and is moved upward on the eye. The near vision zone is thereby transferred before the pupil and the person is able to focus on the near object. It will be appreciated that positioning of the demarcation junction between the distant zone and the near zone is critical and requires a substantial degree of care by the practitioner when fitting the patient. Examples of alternating vision bifocal lenses are shown in U.S. Pat. Nos. 4,728,182; 4,702,513; 4,618,227; 4,614,413; 4,513,775; 4,549,794; 4,324,461; and 4,302,081.

A still further method of providing bifocal vision is one in which the patient is fitted in one eye with a single vision lens corrected for distance vision. The patient's other eye is fitted with a single vision lens corrected for near vision. This technique is commonly known to practitioners as monovision correction. In utilizing this technique, blur is eliminated by the brain's ability to suppress blurred images from one eye when the corresponding images from the other eye are clear. However, when the field of view is restricted to only one eye, such as would be the case when viewing objects located to extreme left or right of the patient, only one focal power is utilized. Accordingly, the patient's head must be shifted in order to provide proper focus. This form of correction is also known to produce difficulty in the maintenance of normal coordination of functions requiring both eyes such as fusing both eyes' images and stereoscopic depth perception.

Within the groups of bifocal lenses described are variations of the themes. For example, in U.S. Pat. No. 4,618,228 entitled "Bifocal Contact Lens of the Bivisual Type", a simultaneous vision bifocal is disclosed. The lens is separated along a vertical line into two different focusing zones. One half of the lens is designed to be positioned nasally on the wearer (closer to the wearer's nose) and contains the reading correction. The other half of the lens is designed to be positioned temporally (away from the wearer's nose) and contains the distance correction. The lens contains ballast to ensure that it maintains its geometric position on the eye. The advantage of this particular lens, according to the inventors, is that the difference in brightness of objects has no effect on their perception through the lens.

SUMMARY OF THE INVENTION

A lens system is disclosed which comprises a pair of contact lenses constructed such that when worn by a patient requiring vision correction for near and distant viewing situations, the near and distant vision corrections for one eye are constructed oppositely in the lens to be worn on the other eye. This lens construction takes advantage of the brain's ability to suppress those images that are blurred so only clear images remain.

DETAILED DESCRIPTION OF THE DRAWINGS

Figure 1:
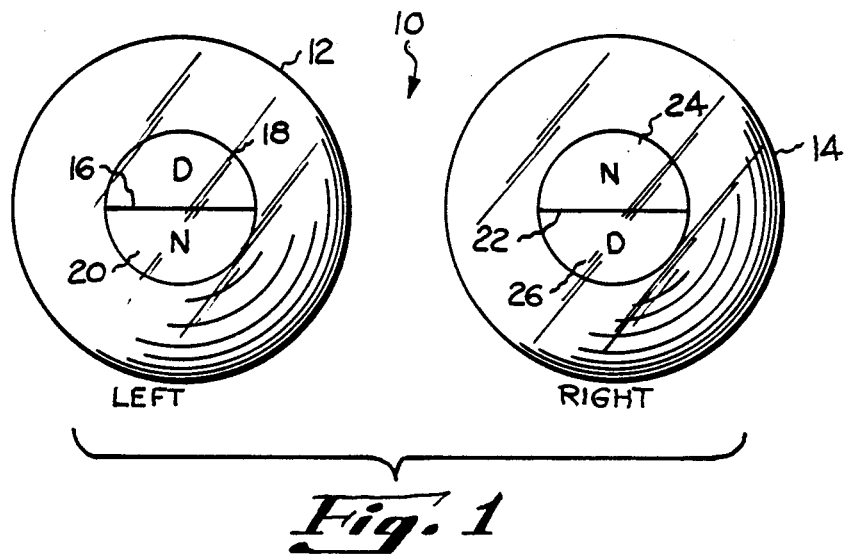
FIG. 1 is a plan view of a contact lens system constructed according to one embodiment of my invention.

FIG. 1 discloses a contact lens system 10 comprising a left lens 12 and a right lens 14 to be worn on the left and right eyes, respectively, of a patient whose vision is being corrected for near and distance vision. The left lens is essentially divided into two halves along a horizontal meridian 16. The upper half 18 is constructed so as to correct the distance vision while the lower half 20 is constructed to correct for near vision. The right lens 14 is similarly divided along a horizontal meridian 22 into two halves. However, in the right lens 22 the upper half 24 includes the near vision correction while the lower half 26 contains the distance vision correction. The horizontal meridian of each lens is designed to extend from edge to edge through substantially the optical center of the lens so as to approximately align with the optical axis of the patient.

Figure 2:
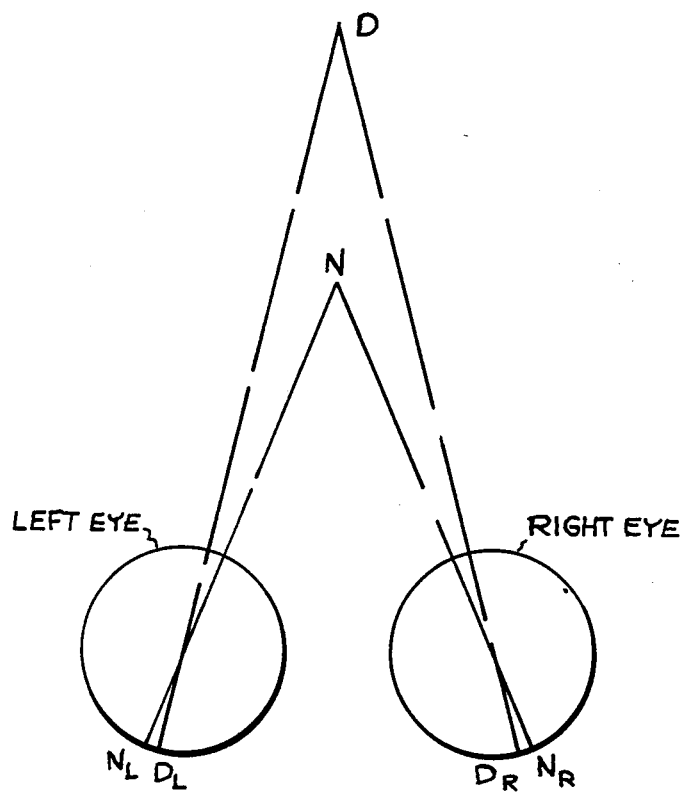
FIG. 2 is a schematic view of a condition wherein a subject is binocularly viewing a pair of objects.

FIG. 2 discloses a graphical representation of a viewing condition wherein a patient 28 is viewing a pair of objects, N and D. Object N is located somewhat closer to the patient 28 than is object D. Object N is positioned such that it is in the range of clear vision for the near vision correction of the lens system shown in FIG. 1 while object D is in the range of clear vision for the distance vision correction. In this representation the patient is binocularly fixating on the object N. Images $N_R$ and $N_L$ are formed at the fovea of the right and left eyes, respectively whereas images $D_R$ and $D_L$ are formed on the right and left eyes (nasal retinas), respectively.

Figure 3:
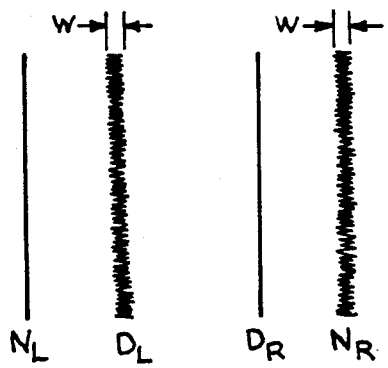
FIG. 3 is a graphical representation of the retinal images formed when viewing the objects of FIG. 2 with monovision correction with the right eye being corrected for distance, vision.

By referring to the graph of FIG. 3, the condition set forth above will be described as if the patient is being corrected by utilizing the principles of monovision. It will be appreciated that one eye, for instance the left eye, is clearly focusing the image $N_L$ as represented by the distinct vertical line. However, the other eye, because of the different power correction is unable to provide proper focus of the image $N_R$, as represented by the fuzzy vertical line. The reduction of stereoacuity in this instance is approximately proportional to the width W of the blurred image of the least clear image. The binocular disparity is uncertain to the extent that the horizontal position of $N_L$ and $D_R$ may correspond to a range of positions within the fuzzy vertical lines as represented by $N_R$ and $D_L$.

Figure 4:
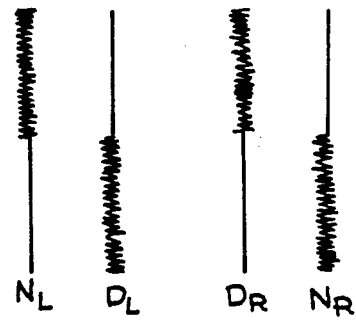
FIG. 4 is a graphical representation of the retinal images formed when viewing the objects of FIG. 2 utilizing the contact lens system constructed according to the principles of the present invention as shown in FIG. 1.

Accordingly, by referring to the graphical representation of FIG. 4, it will be seen how utilization of the lens system of the present invention overcomes the problem referenced above. By utilizing the lens system with the near and distance zones placed alternately, images are presented which are partially in and out of focus as represented by the lines $N_L$, $D_L$, $N_R$ and $D_R$. In this instance, the brain suppresses the blurred images produced in both eyes while precisely aligning the clear images to produce a totally sharp and clear image. That is, the blurred or fuzzy portion of the near image shown by the upper half of $N_L$ and by the lower half of $N_R$ are suppressed by the brain while the sharply focused portion of the image, as depicted by the lower half of $N_L$ and the upper half of $N_R$ are precisely aligned. A similar phenomena occurs with image represented by $D_L$ and $D_R$. The fuzzy, or out of focus, components are eliminated by the brain much the same as the brain eliminates out of focus information produced by monovision correction.

Figure 5:
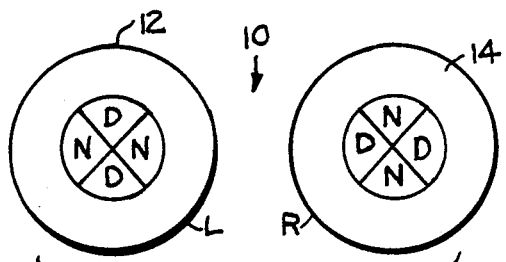
FIGS. 5-8 are alternate embodiments of my contact lens system as shown in FIG. 1.
Figure 6:
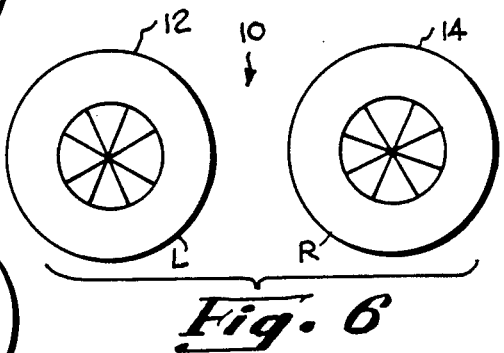
Figure 7:
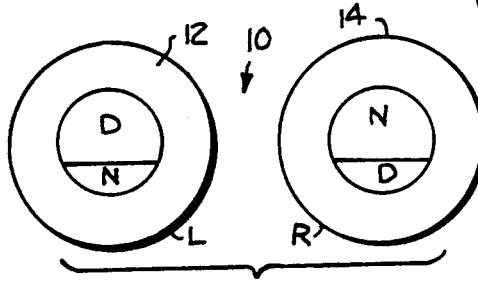
Figure 8:
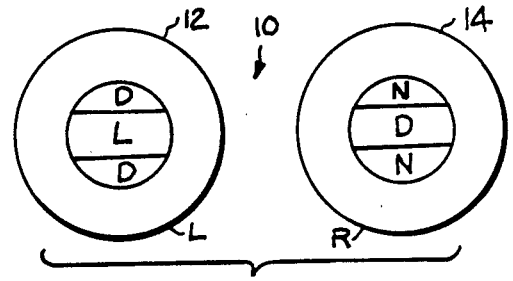

In the alternate embodiments shown in FIGS. 5 and 6, a pair of contact lenses are divided into multiple vision zones. The embodiment disclosed in FIG. 5 shows the lenses being divided into four zones, while the embodiment of FIG. 6 discloses lenses divided into eight zones. In either embodiment, the near vision zones of one corrective lens are correlated to the distance vision zones of the matching lens. Further embodiments of the present invention are shown in FIGS. 7 and 8.

Although contact lenses have been specifically discussed, it should be understood that other corrective lenses such as intraocular lenses may be similarly constructed. Still further, it will be appreciated from the foregoing that a means of providing orientation control is desirable. Any of the well known techniques such as ballasting, either peripheral, prism or weight, is effective. By controlling orientation of the lenses on the eyes, the proper power correction orientation is provided. Additionally, the lenses set forth herein may be constructed from rigid, semi-rigid or flexible materials. As such, it will be understood that the specification and examples set forth are for illustrative purposes only and are not meant to limit the scope of the invention as set forth in the claims appended hereto.

I claim:

1. A lens system for correcting near and distant vision in humans, comprising:
a pair of contact lenses whose optical surfaces are divided into at least two substantially discrete zones, the junction of said zones extending from edge to edge of each lens through substantially the optical center of said lenses, but not along a vertical axis, the position of said discrete zones which, when said lenses are worn one upon the right eye and one upon the left eye, are such that relative to the line of sight of the wearer each zone of one lens defining a distance power correction corresponds to a similar zone defining a near power correction on the other lens.

2. The lens system as set forth in claim 1 wherein said contact lenses are divided along a substantially horizontal axis into two vision zones.

3. The lens system as set forth in claim 2, wherein said horizontal axis does not coincide with said optical axis and divides said contact lenses into unequal segments with corresponding segments of each lens being of substantially similar size.

4. The lens system as set forth in claim 1 wherein said contact lenses are divided into an even number of discrete zones.

5. The lens system as set forth in claim 3 wherein said contact lenses are divided into an odd number of discrete zones.

6. The lens system as set forth in claim 1 wherein each of said lenses is provided with means for controlling orientation on the eyes.

7. A lens system for correcting near and distant vision in humans, comprising:
a pair of intraocular lenses whose optical surfaces are divided into at least two substantially discrete zones, the junction of said zones extending from edge to edge of each lens through substantially the optical center of said lenses, but not along a vertical axis, the position of said discrete zones which, when said lenses are worn one in the right eye and one in the left eye, are such that relative to the line of sight of the wearer each zone of one lens defining a distance power correction corresponds to a similar zone defining a near power correction on the other lens.

* * * * *

UNITED STATES PATENT AND TRADEMARK OFFICE
CERTIFICATE OF CORRECTION

PATENT NO. : 4,923,296
DATED : May 8, 1990
INVENTOR(S) : Paul M. Erickson

It is certified that error appears in the above-identified patent and that said Letters Patent is hereby corrected as shown below:

Title page of the patent, in the title (54) delete "Introaocular" and substitute therefor --Intraocular--.

Col. 1, in the title, delete "Introaocular" and substitute therefor

--Intraocular--.

Signed and Sealed this

Tenth Day of September, 1991

Attest:

*Attesting Officer*

HARRY F. MANBECK, JR.

*Commissioner of Patents and Trademarks*